US008438552B2

(12) United States Patent
Dai et al.

(10) Patent No.: US 8,438,552 B2
(45) Date of Patent: May 7, 2013

(54) APPARATUS AND METHOD FOR AUTOMATICALLY PARALLELIZING NETWORK APPLICATIONS THROUGH PIPELINING TRANSFORMATION

(75) Inventors: Jinquan Dai, Shanghai (CN); Luddy Harrison, Chestnut, MA (US); Bo Huang, Shanghai (CN); Cotton Seed, Cambridge, MA (US); Long Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 12/751,929

(22) Filed: Mar. 31, 2010

(65) Prior Publication Data

US 2010/0223605 A1 Sep. 2, 2010

Related U.S. Application Data

(63) Continuation of application No. 10/714,465, filed on Nov. 14, 2003, now Pat. No. 7,793,276.

(51) Int. Cl.
*G06F 9/45* (2006.01)

(52) U.S. Cl.
USPC ............................. 717/144; 717/140; 717/149

(58) Field of Classification Search .................... None
See application file for complete search history.

(56) References Cited

U.S. PATENT DOCUMENTS

| | | | |
|---|---|---|---|
| 6,651,246 B1 | 11/2003 | Archambault et al. | |
| 7,233,998 B2 | 6/2007 | Suzuoki et al. | |
| 7,392,511 B2 | 6/2008 | Brokenshire et al. | |
| 7,793,276 B2 * | 9/2010 | Dai et al. | 717/144 |
| 8,122,441 B2 * | 2/2012 | Barsness et al. | 717/144 |
| 8,214,814 B2 * | 7/2012 | Barsness et al. | 717/144 |
| 8,261,249 B2 * | 9/2012 | Archer et al. | 717/149 |
| 2002/0138637 A1 | 9/2002 | Suzuoki et al. | |
| 2005/0081181 A1 | 4/2005 | Brokenshire et al. | |
| 2005/0235276 A1 * | 10/2005 | Dai et al. | 717/140 |
| 2009/0193405 A1 * | 7/2009 | Jiang et al. | 717/140 |
| 2011/0209129 A1 * | 8/2011 | Komatsu et al. | 717/149 |

OTHER PUBLICATIONS

Intel Corporation, "Supra-linear Packet Processing Performance with Intel Multi-core Processors", 2006 Intel Corporation, pp. 1-8; <http://download.intel.com/technology/advanced_comm/31156601.pdf>.*

Wang et al., "Practice of Parallelizing Network Applications on Multi-core Architectures", 2009 ACM, ICS'09, Jun. 0-12, 2009, York Town Heights, NewYork, USA, pp. 1-10; <http://dl.acm.org/citation.cfm?id=1542275.1542307&coll=DL&dl=GUIDE&CFID=242156408&CFTOKEN=79743876>.*

(Continued)

*Primary Examiner* — Thuy Dao
*Assistant Examiner* — Ben C Wang
(74) *Attorney, Agent, or Firm* — Blakely, Sokoloff, Taylor & Zafman LLP

(57) ABSTRACT

In some embodiments, a method and apparatus for automatically parallelizing a sequential network application through pipeline transformation are described. In one embodiment, the method includes the configuration of a network processor into a D-stage processor pipeline. Once configured, a sequential network application program is transformed into D-pipeline stages. Once transformed, the D-pipeline stages are executed in parallel within the D-stage processor pipeline. In one embodiment, transformation of a sequential application program is performed by modeling the sequential network program as a flow network model and selecting from the flow network model into a plurality of preliminary pipeline stages. Other embodiments are described and claimed.

33 Claims, 14 Drawing Sheets

OTHER PUBLICATIONS

Lee et al., "Automatic Parallelization of Fine-Grained Meta-Functions on a Chip Multiprocessor", 2011 IEEE, pp. 130-140; <http://ieeexplore.ieee.org/stamp/stamp.jsp?tp=&arnumber=5764681>.*

Dai, J., et al., "Automatically Partitioning Packet Processing Application for Pipelined Architectures," Proc. of ACM Sigplan 2005, Jun. 12, 2005, pp. 237-248, XP002333780.

Goldberg, A.V., et al., "A New Approach to the Maximum Flow Problem," Proc. 18th ACM STOC, (1986), pp. 136-146.

Goldberg, et al., "A New Approach to the Maximum-Flow Problem," ACM, (1998), pp. 921-940.

Gupta, et al., "Compilation Techniques for Parallel Systems," Elsevier Science B.V., (1999), pp. 1741-1783.

Intel Corporation, "Introduction to the Auto-Partitioning Programming Model," White Paper Online, Oct. 2003, pp. 1-10, XP002333777.

Lakshmanamurthy, et al., "Network Processor Performance Analysis Methodology," Intel Technology Journal, vol. 6, Issue 3, (Aug. 15, 2002), pp. 19-28.

Liu, H., et al., "Network flow based circuit partitioning for time-multiplexed FPGAs," IEEE/ACM Int'l Conf. on Computer-Aided Design, NY, NY, 1998, pp. 497-504, XP002333779.

Lyuh, et al., "High-Level Synthesis for Low Power Based on Network Flow Method," IEEE, (Jun. 2003), pp. 364-375.

Paulin, et al., "Network Processors: A Perspective on Market Requirements, Processor Architectures and Embedded S/W Tools," IEEE, (2001), pp. 420-427.

Rakhmatov, et al., "Hardware-Software Bipartitioning for Dynamically Reconfigurable Systems," ACM, (2002), pp. 145-150.

Robschink, et al., "Efficient Path Conditions in Dependence Graphs," ACM, (2002), pp. 478-488.

Shah, et al., "NP-Click: A Programming Model for the Intel IXP1200," 2nd Workshop on Network Processors (NP-2), 9th International Symposium on High Performance Computer Architectures (HPCA), University of California, Berkeley, (Feb. 2003), pp. 1-12.

Yang, et al., "Efficient Network Flow Based Min-Cut Balanced Partitioning," ACM, (1994), pp. 50-55.

Ziegler, et al., "Compiler-Generated Communication for Pipelined FPGA Applications," ACM, (Jun. 2, 2003), pp. 610-615.

* cited by examiner

FIG. 2A

SEQUENTIAL PPS 280

```
valid Ingress_PPS ()
{
  //the PPS loop
  for (;;)
  {
    Receive_Packet ();
    IPv4_Forward ();
    Enqueue_packet ();
  }
}
```

FIG. 2B

PIPELINED PPS 300

```
valid Ingress_PPS_Stage1 ()
{
  //the PPS loop
  for (;;)
  {
    Receive_Packet ();
  }
}
```

→ data 1 →

```
valid Ingress_PPS_Stage2 ()
{
  //the PPS loop
  for (;;)
  {
    IPv4_Forward ();
  }
}
```

→ data 2 →

```
valid Ingress_PPS_Stage3 ()
{
  //the PPS loop
  for (;;)
  {
    Enqueue_packet ();
  }
}
```

```
void MyPPS()
{
  for (;;)
  {
    if (p ())
    {
      x = f1 ();
      y = g1 ();
    }
    else
    {
      x = f2 ();
      y = g2 ();
    }
    z = h (x,y);
  }
}                    290
```

FIG. 3A

```
void MyPPS2()
{
  for (;;)
  {
    if (p ())
    {
      x1 = f1 ();
      y1 = g1 ();
    }
    else
    {
      x2 = f2 ();
      y2 = g2 ();
    }
    x = phi (x1, x2);
    y = phi (y1, y2);
    z = h (x, y);
  }
}                    400
```

FIG. 4

```
void MyPPS2_Stage1 ()
{
  for (;;)
  {
    if (p ())
    {
      c = 1;
      x = f1 ();
    }
    else
    {
      c = 2;
      x = f2 () ;
    }
    Send_To_Stage2 (c, x);
  }
}                    310
```

```
void MyPPS2_Stage2 ()
{
  for (;;)
  {
    Receive_From_Stage1 (&c, &x);
    if (C ==1)
    {
      y = g1 ();
    }
    else
    {
      y = g2 ();
    }
    z = h (x,y);
  }
}                    320
```

FIG. 3C

APPARATUS AND METHOD FOR AUTOMATICALLY PARALLELIZING NETWORK APPLICATIONS THROUGH PIPELINING TRANSFORMATION

CROSS REFERENCE TO RELATED APPLICATIONS

This application is a continuation of U.S. patent application Ser. No. 10/714,465 filed on Nov. 14, 2003 now U.S. Pat No. 7,793,276.

FIELD OF THE INVENTION

One or more embodiments of the invention relate generally to the field of network processor applications. More particularly, one or more of the embodiments of the invention relates to a method and apparatus for automatically parallelizing network applications through pipelining transformation.

BACKGROUND OF THE INVENTION

Network processors (NP) are specifically designed to perform packet processing. Conventionally, network processors may be used to perform such packet processing as a core element of high-speed communication routers. In order to address the unique challenges of network processing at high speeds, modern NP generally have a highly parallel multi-processor architecture. For instance, the Internet exchange processor (IXP) series, which belongs to the Intel® Internet Exchange™ Architecture (IXA) NP family, include NP that process packets using a micro-engine cluster. The micro-engine cluster may consist of multiple micro-engines (programmable processors with packet processing capability) running in parallel.

However, in contrast to the highly parallel multi-processor architecture utilized by network processors, traditional network applications are easily coded using sequential semantics. Generally, such network applications are typically coded to use a unit of packet processing (a packet processing stage (PPS)) that runs forever. Hence, when a new packet arrives, the PPS performs a series of tasks (e.g., receipt of the packet, routing table look-up and enqueuing on that packet. Consequently, it is usually expressed as an infinite loop (or a PPS loop) with each iteration processing a different packet.

Hence, there is a large gap between the parallel architecture of network processors and the sequential semantics of network applications. One way to address this problem is to adapt the paradigm of parallel programming for coding traditional network applications. As known to those skilled in the art, parallel program involves partitioning the application into subtasks, managing the synchronization and communication among the different subtasks and mapping the various subtasks onto a multi-processor system. Unfortunately, such a parallel programming paradigm is untraditional and not familiar to many.

BRIEF DESCRIPTION OF THE DRAWINGS

The various embodiments of the present invention are illustrated by way of example, and not by way of limitation, in the figures of the accompanying drawings and in which:

FIGS. 2A-2B depict pipeline transformation of a sequential network application program, in accordance with one embodiment of the invention.

FIGS. 3A-3C depict live variable transmission between pipelined stages formed from a sequential packet processing stage, in accordance with one embodiment of the invention.

FIG. 4 illustrates initial transformation of the sequential PPS loop of FIG. 3A, in accordance with one embodiment of the invention.

DETAILED DESCRIPTION

A method and apparatus for automatically parallelizing a sequential network application through pipeline transformation are described. In one embodiment, the method includes the configuration of a network processor into a D-stage processor pipeline. Once configured, a sequential network application is transformed into D-pipeline stages. Once transformed, the D-pipeline stages are executed in parallel within the D-stage processor pipeline. In one embodiment, transformation of a network application is performed by modeling the network application as a flow network model and cutting the flow network model into D pipeline stages, such that D−1 cuts result in the D-pipeline stages.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM," flash memory), a floppy diskette, an optical disk (e.g., compact disk or digital video disk "DVD"), a hard drive disk, tape, or the like.

In one embodiment, the present invention may be provided as an article of manufacture which may include a machine or computer-readable medium having stored thereon instructions which may be used to program a computer (or other electronic devices) to perform a process or operations according to one embodiment of the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

System

Figure 1:
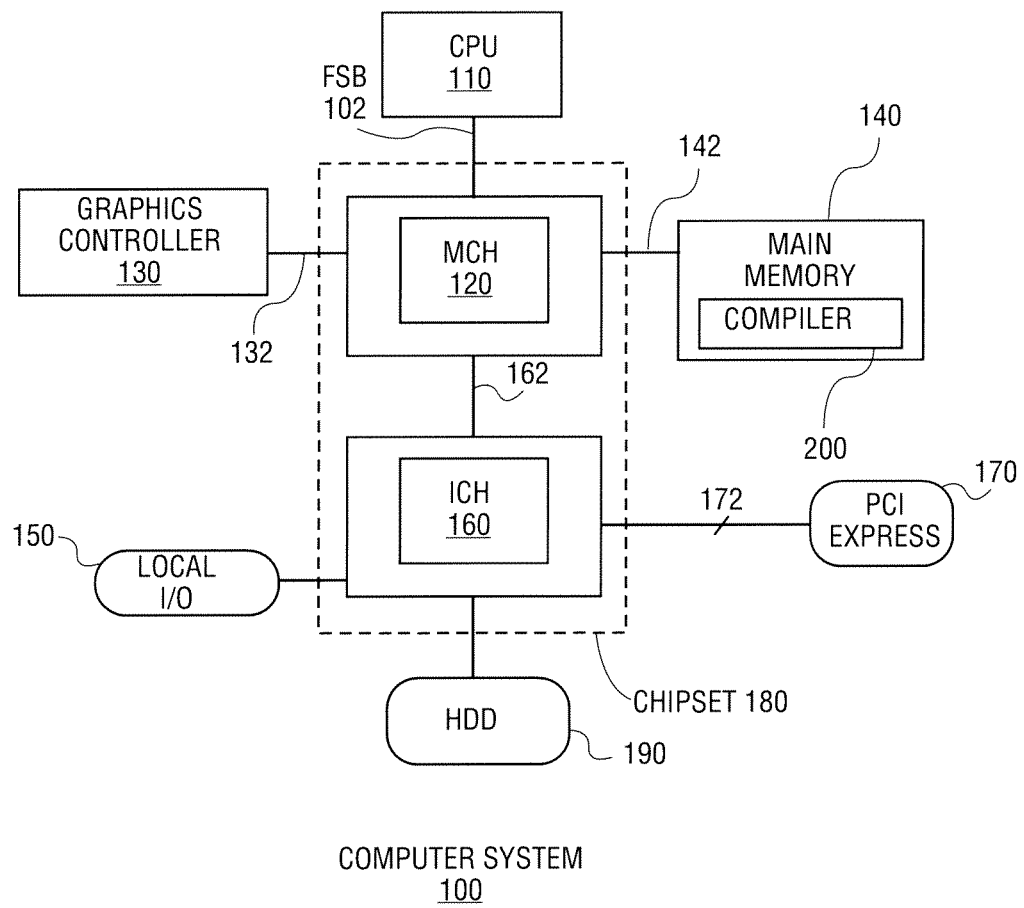
FIG. 1 is a block diagram of a computer system implementing a parallelization compiler to perform pipeline transformation of a sequential application program, in accordance with one embodiment of the invention.

FIG. 1 is a block diagram illustrating a computer system 100 including a parallelization compiler 200, in accordance with one embodiment of the invention. As illustrated, computer system 100 includes a CPU 110, memory 140 and graphics controller 130 coupled to memory controller hub (MCH) 120. As described herein, MCH 120 may be referred to as a north bridge and, in one embodiment, as a memory controller. In addition, computer system 100 includes I/O (input/output) controller hub (ICH) 160. As described herein ICH 160 may be referred to as a south bridge or an I/O controller. South bridge, or ICH 160, is coupled to local I/O 150 and hard disk drive devices (HDD) 190.

In the embodiment illustrated, ICH 160 is coupled to I/O bus 172 which couples a plurality of I/O devices, such as, for example, PCI or peripheral component interconnect (PCI) devices 170, including PCI-express, PCI-X, third generation I/O (3GIO), or other like interconnect protocol. Collectively, MCH 120 and ICH 160 are referred to as chipset 180. As described herein, the term "chipset" is used in a manner well known to those skilled in the art to describe, collectively, the various devices coupled to CPU 110 to perform desired system functionality. In one embodiment, main memory 140 is volatile memory including, but not limited to, random access memory (RAM), synchronous RAM (SRAM), dynamic RAM (DRAM), synchronous DRAM (SDRAM), double data rate (DDR) SDRAM (DDR SDRAM), Rambus DRAM (RDRAM), direct RDRAM (DRDRAM), or the like.

In contrast to conventional computer systems, computer system 100 includes parallelization compiler 200 for transforming a sequential network application into a D-pipeline stage, parallel network application. Hence, compiler 200 may bridge the gap between the parallel architecture of network processors and the sequential programming model used to code conventional network applications. One way to address this problem is to code network applications using a parallel programming paradigm. Unfortunately, such a parallel programming paradigm is generally untraditional and unfamiliar to network programmers. In accordance with one embodiment of the invention, a parallelizing compiler 200 is provided to automatically transform a sequential network application into a parallel network application as illustrated in FIGS. 2A and 2B.

Referring to FIG. 2A, a sequential packet processing stage (PPS) 280 of a sequential network application is illustrated. As depicted in FIG. 2A, PPS 280 may be transformed into a three-pipeline stage parallel, network application pipeline 300 for execution within, for example, a D-stage processor pipeline of network processor 500 of FIG. 8. In one embodiment, a sequential PPS of a network application is transformed into a D-pipeline stage parallel, network application through pipeline transformation, for example, as illustrated with reference to FIGS. 3A-3C.

Representatively, PPS 290 is cut into D-PPS pipeline stages (FIGS. 3B and 3C) with D=2, each of which contains a portion of the functionality from the original PPS 290. In one embodiment, selection of the D-pipeline stages is performed by modeling PPS 290 according to a network flow model. A graph G=(V,E) is a flow network if it has two distinguished vertices, a source s and a sink t, and a positive real-valued capacity c(v,w) for each edge (v,w)∈E. A v-w cut (cut) (X, ) of a direct flow network N=(V,E) is a bipartition of V into X and such that v∈X and w∈. An edge with the starting node is in X and with the ending node is in is called a forward edge. The capacity of the cut (X, ) is the sum of the capacities on the forward edges only from X to .

As described herein, the term "cut" refers to a set of control flow points that divide a PPS loop body into two pieces. Collectively, one or more cuts performed to a PPS loop body form a plurality of PPS pipeline stages. In one embodiment, if a PPS loop body is partitioned into D-stages, D−1 cuts are selected from PPS loop body 290. In one embodiment, cuts are not overlapping. In one embodiment transformation of a network application into D-pipeline stage parallel, network application begins with an initial conversion of the network application.

Figure 5:
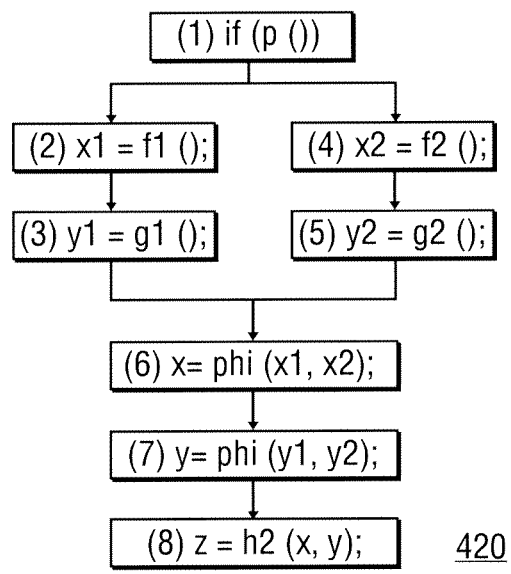
FIG. 5 illustrates a control flow graph (CFG) formed from a PPS loop body of FIG. 3A, in accordance with one embodiment of the invention.

In one embodiment, the network application program is transformed into static single-assignment (SSA) form. Representatively, sequential PPS 290 (FIG. 3A) is transformed into an SSA code sequence 400 as illustrated in FIG. 4. Once transformed, a control flow graph is formed from SSA code sequence 400 of FIG. 4 for a PPS body of PPS loop 290 of FIG. 3A. In one embodiment, a PPS loop body of FIG. 3A is modeled as a control flow graph (CFG), as illustrated in FIG. 5. As described herein, a CFG is a graph representing the flow of control of the program, where each vertex represents a basic block, and each edge shows the potential flow of control between basic blocks. A CFG has a unique source node (entry).

Representatively, each node in the control flow graph is required to lie in one pipeline stage once all cuts are applied. In one embodiment, strongly connected components (SSC) nodes of CFG 420 of FIG. 5 are identified. An SSC is a subset, S, of the nodes of a directed graph such that any node in S is reachable from any other node in S and S is not a subset of any larger such set. Once identified, a summary of CFG 420 is formed. In one embodiment, the identification of SSC nodes within the summary graph is used to eliminate control dependence from later stages to earlier ones. Accordingly, in one embodiment, pipeline transformation, as described herein, should not split any SSC nodes, which are potentially loops, of CFG 420.

Figure 6:
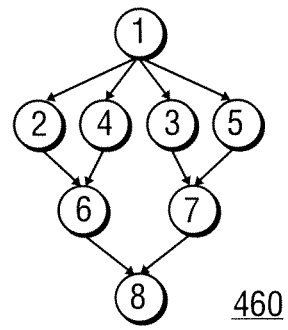
FIG. 6 depicts a dependence graph formed from a summary graph of the CFG of FIG. 5, in accordance with one embodiment of the invention.

As illustrated in FIG. 6, a dependence graph is formed from a summary graph of CFG 420 of FIG. 5. In one embodiment, dependence graph (DG) 460 is used to eliminate data dependence from earlier stages to later stages. In one embodiment, DG 460 illustrates PPS loop carried flow dependence in addition to the non-loop carried data and control dependence. Accordingly, source and sink of the PPS loop carried flow dependence are generally in the same SSC nodes of the DG 460. From directed graph 460, a summary of directed graph is formed, which also identified SSC nodes therein. Accordingly, SSC nodes for dependence graph 460 ensure that pipeline transformation is limited to consideration of cuts that place a whole SSC on one or more side-by-side cuts.

Figure 7:
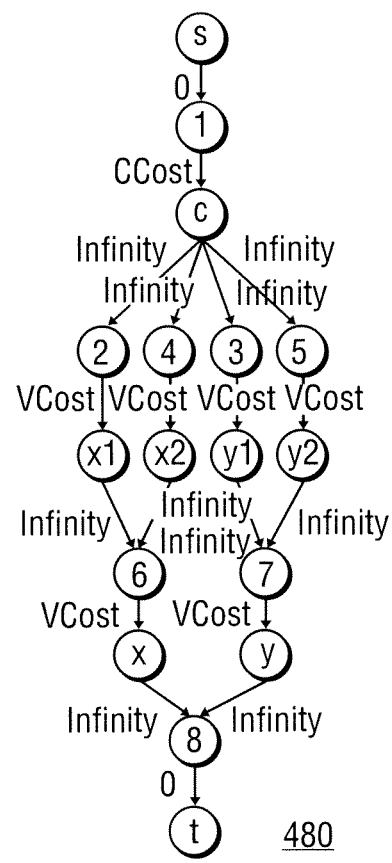
FIG. 7 illustrates a control flow model formed from a summary graph of the directed graph of FIG. 6, in accordance with one embodiment of the invention.

As illustrated with reference to FIG. 7, in one embodiment, a control flow model 480 is formed from a summary graph of directed graph 460 of FIG. 6. Flow network model includes a unique source node and a unique sink node and a plurality of program nodes that contain instructions. In addition to the unique source and sink nodes and program nodes containing instructions, variable nodes and control nodes are introduced in the flow network for each object that may be included in the live set. After the SSA transformation (FIG. 4), every variable has only one definition point, and hence has only one definition edge. This is also the case with the control nodes.

Hence, the weight (capacity) associated with the definition edges (VCost for variables and CCost for control object) correctly models the cost of transmitting the associated variable or control object if that edge is a cut. In addition, the weight of edges going out of the source and coming into the sink are set to zero, as cutting such an edge will not incur any transmission of live set data. All the other edges have infinite weights so that they are not subjected to cutting. From flow network model 480 of FIG. 7, cuts may be selected which result in a balanced code size.

In one embodiment, selected cuts are generally required to meet one or more of the following criteria. Selected cuts eliminate any data or control dependence from later stages to earlier stages. Furthermore, one embodiment requires the minimization of data that is alive at the boundary between adjoining stages. As described herein, data that is alive at the boundary of adjoining stages is referred to as "live set data". In a further embodiment, selection of live cuts is required to provide balanced code size between application program stages. In one embodiment, the selection of cuts is required, which provide a balanced minimum cost cut. In one embodiment, a heuristic of an iterative balanced, push-relabel algorithm is utilized to select balanced, minimum cost cuts in flow network model of FIG. 7.

Figure 8:
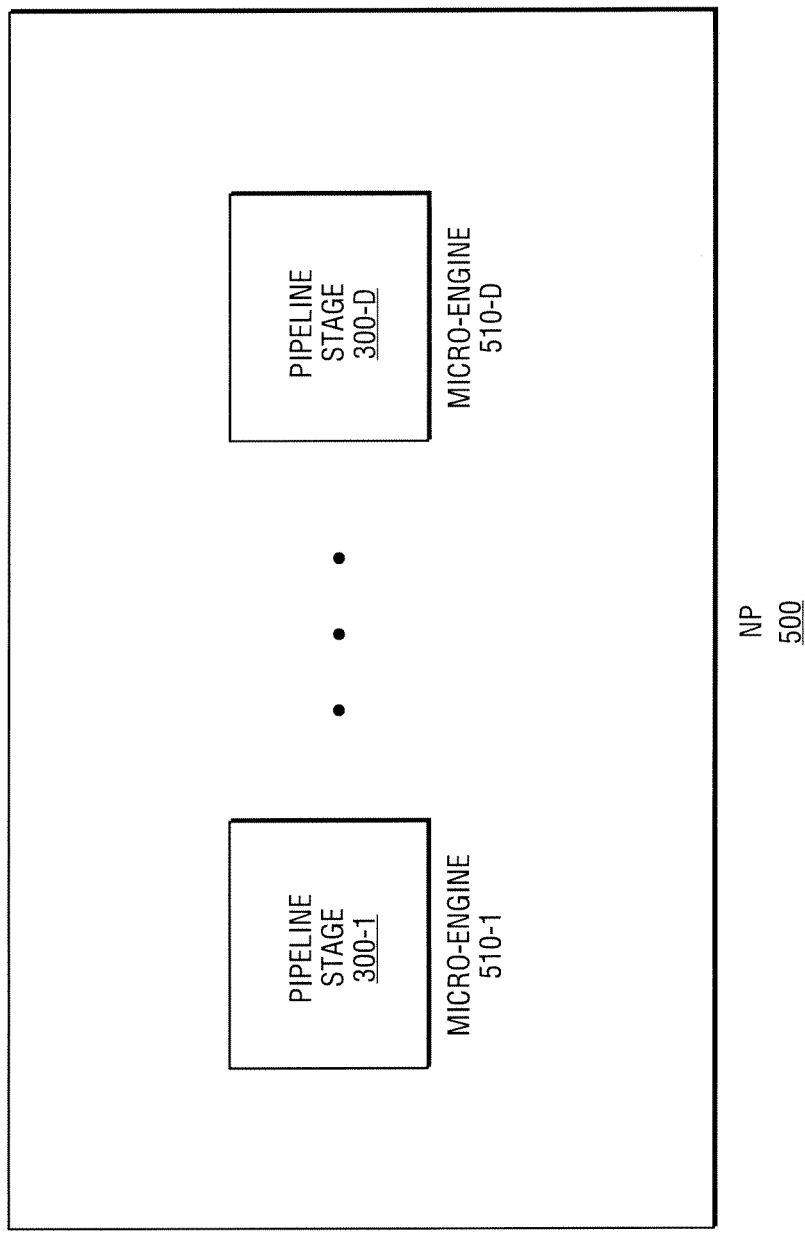
FIG. 8 is a block diagram illustrating a network processor configured to provide a D-stage processor pipeline, in accordance with one embodiment of the invention.

FIG. 8 is a block diagram illustrating a network processor (NP) 100 configured to provide a D-stage processor pipeline, in accordance with one embodiment of the invention. Representatively, two or more processors are organized as a pipeline where each stage contains a portion of the originally PPS loop. Consequently, per-processor resources (e.g., cache) can be more heavily utilized. By pipelining the processing of each packet, the stringent performance budget for packet processing can be distributed over all the pipeline stages. Consequently, the throughput of the network application is improved. Eliminating the dependence from later stages from earlier stages avoids complex synchronization between every iteration of the originally PPS loop. By selecting the balanced minimum cost cut, the communication between stages is reduced. Procedural methods for implementing embodiments of the invention are now described.

Operation

Figure 9:
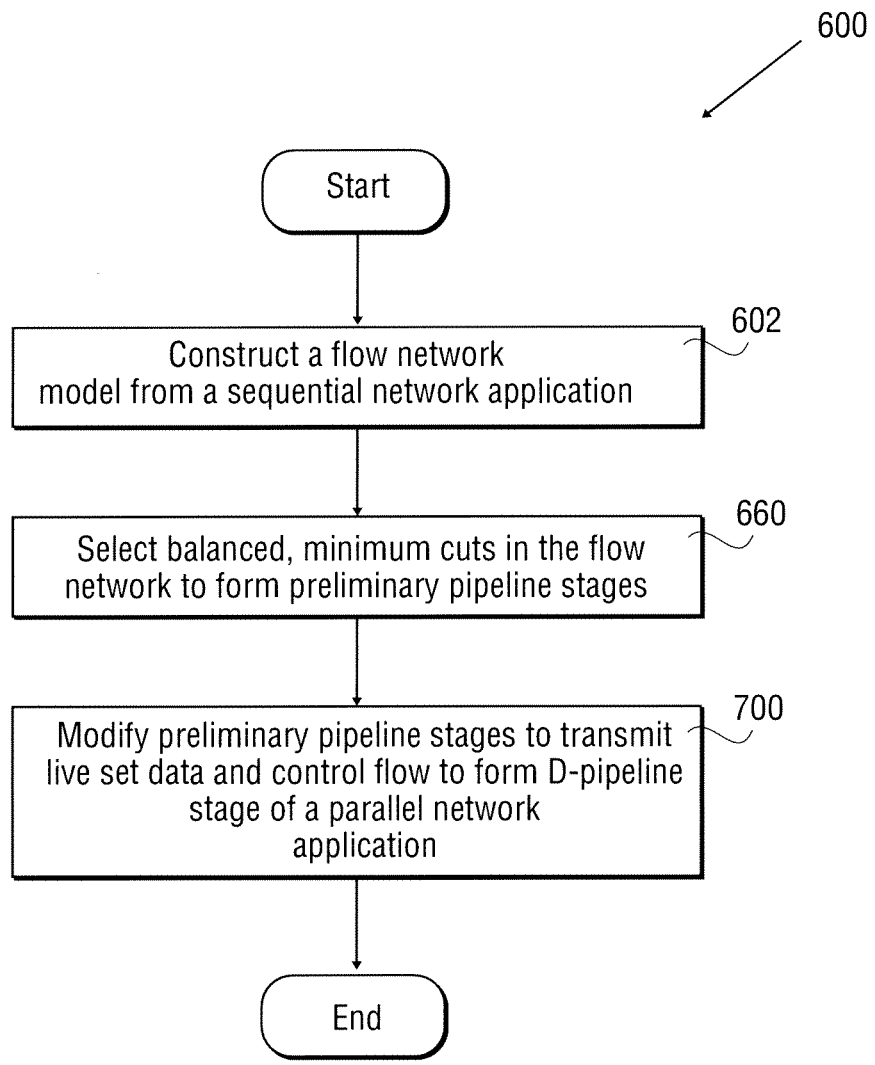
FIG. 9 is a flowchart illustrating a method for pipeline transformation of a sequential network application, in accordance with one embodiment of the invention.

FIG. 9 is a flowchart illustrating a method for 600 pipeline transformation of a sequential application program, such as a sequential network application, in accordance with one embodiment of the invention. At process block 602, a flow network model is constructed for a sequential network application. Once constructed, at process block 660, the flow network model is cut into a plurality (D) of preliminary pipeline stages. In one embodiment, the flow network model is cut into D-pipeline stages for execution within, for example, D-stage processor pipeline of NP 500 of FIG. 8. In one embodiment, a flow network model may be formed as illustrated by flow network model 480 of FIG. 7. At process block 700, the D-preliminary pipeline stages are modified to perform control flow and variable transmission therebetween to form D-pipeline stages of a parallel network application, such as application 300 of FIG. 2B.

Figure 10:
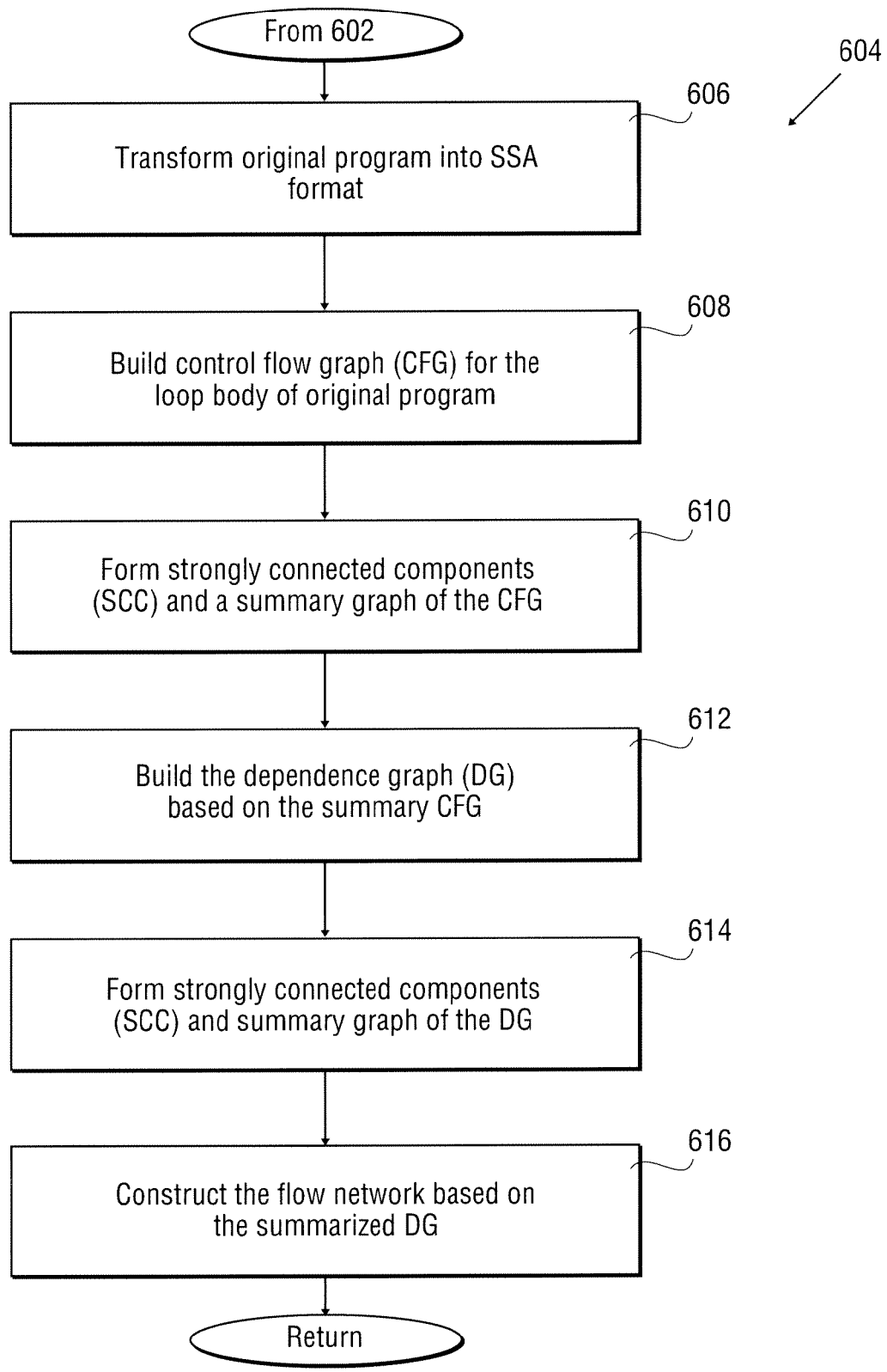
FIG. 10 is a block diagram illustrating a flowchart for construction of a flow network model, in accordance with one embodiment of the invention.

FIG. 10 is a flowchart illustrating a method 604 for constructing a flow network model of process block 602 of FIG. 9, in accordance with one embodiment of the invention. At process block 606, the sequential application program is transformed into a static, single-assignment (SSA) form, for example, as depicted in FIG. 4. At process block 608, a control flow graph (CFG) is built from a loop body of the application program, for example, as illustrated with reference to FIG. 5. At process block 512, a dependence graph (DG) is built based on a summary graph of the CFG and identified strongly connected components (SSC) of the CFG, formed at process block 610, for example, as illustrated with reference to FIG. 7. At process block 616, the flow node model is constructed according to a summary graph of the DG and identified SSC nodes of the DG, formed at process block 614. In one embodiment, a flow network model, as illustrated with reference to FIG. 7, is generated from sequential application program 290 of FIG. 3A.

Figure 11:
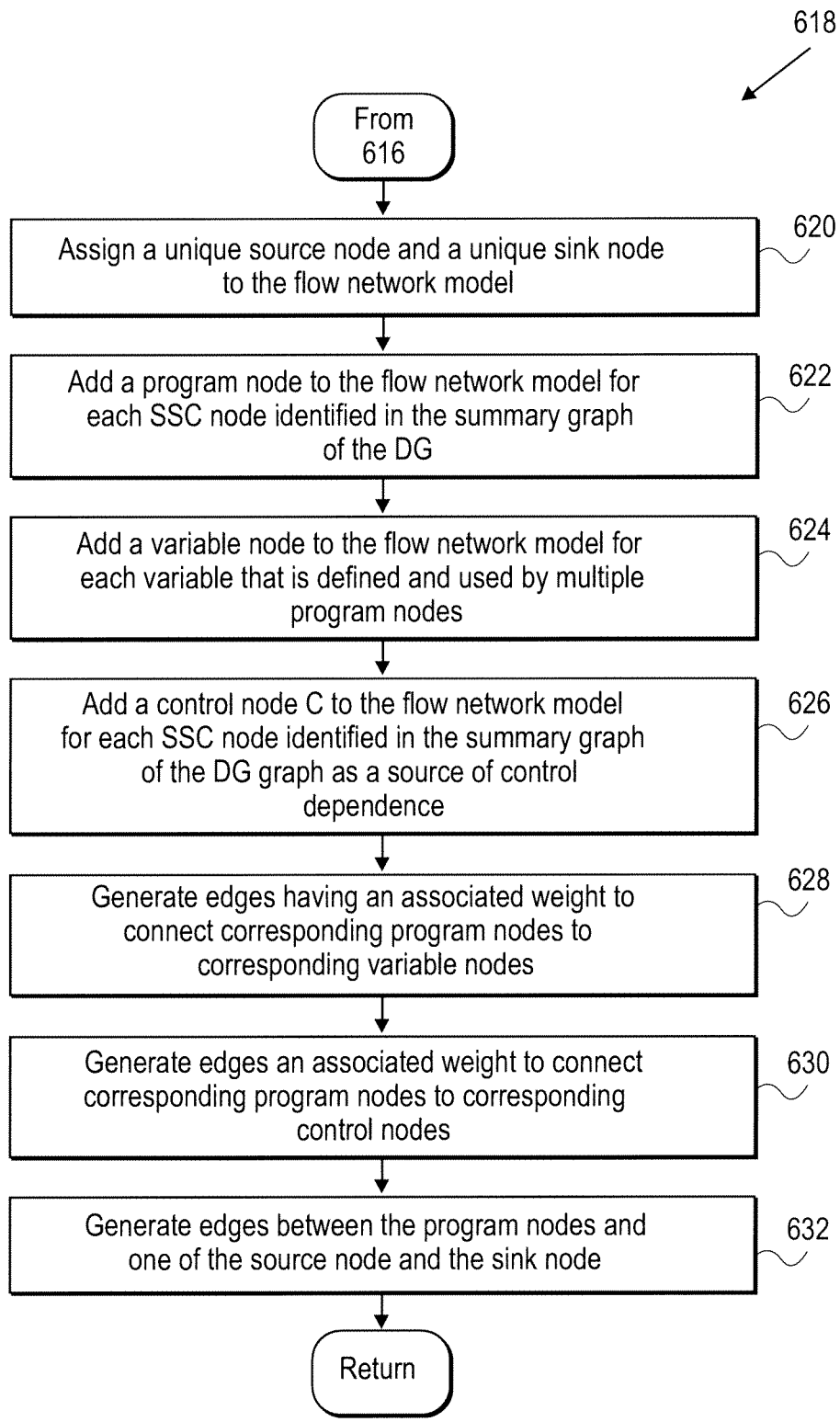
FIG. 11 is a flowchart illustrating a method for constructing a flow network, in accordance with one embodiment of the invention.

FIG. 11 is a flowchart illustrating a method 618 for constructing the flow network model of process block 616 of FIG. 10, in accordance with one embodiment of the invention. At process block 620, the flow network model is assigned a unique source and a unique sink node. Once added, at process block 622, a program node is added to the flow network model for each SSC node identified in the summary graph of the DG. Once the program nodes are added, at process block 624, a variable node is added to the flow network for each variable of the application program that is defined and used by multiple program nodes.

Figure 12:
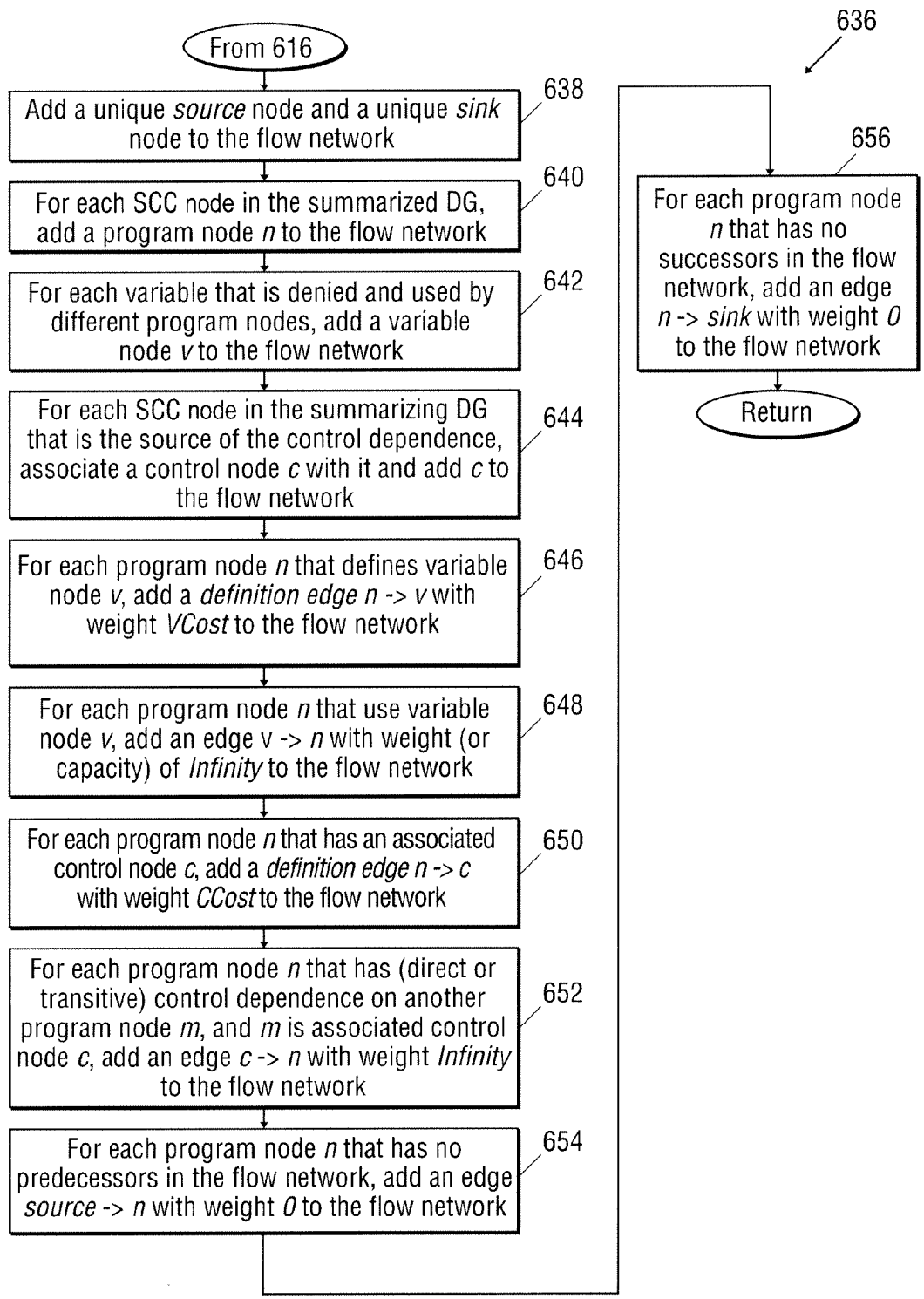
FIG. 12 is a flowchart illustrating a method for constructing a flow network, in accordance with one embodiment of the invention.

At process block 626, a control node is added to the flow network model for each SSC node identified in the summary graph of the DG as a source of controlled dependence. At process block 628, edges are generated to connect corresponding program nodes to corresponding variable nodes. At process block 630, edges are generated to connect corresponding program nodes to corresponding control nodes. In one embodiment, a weight is assigned to each generated edge. At process block 632, edges are generated between the program nodes and one of the source node and the sink node. In one embodiment, a flow network model is formed according to a flowchart illustrating a method 636, as depicted in FIG. 12.

Once a flow network model is formed, in one embodiment, the weight (or capacity) associated with definition edges (VCost for variables and CCosts for control objects) correctly models the costs of transmitting the associated variable or control object if the corresponding edge within the flow network model is cut. As such, in one embodiment, once a flow network model is formed, the flow network model is cut into D (the pipelining degree) stages. Hence, the transformation applies D−1 successive cuts to, for example, a packet processing stage (PPS) of a network application program, such that each cut is a balanced minimum cost cut.

Figure 13:
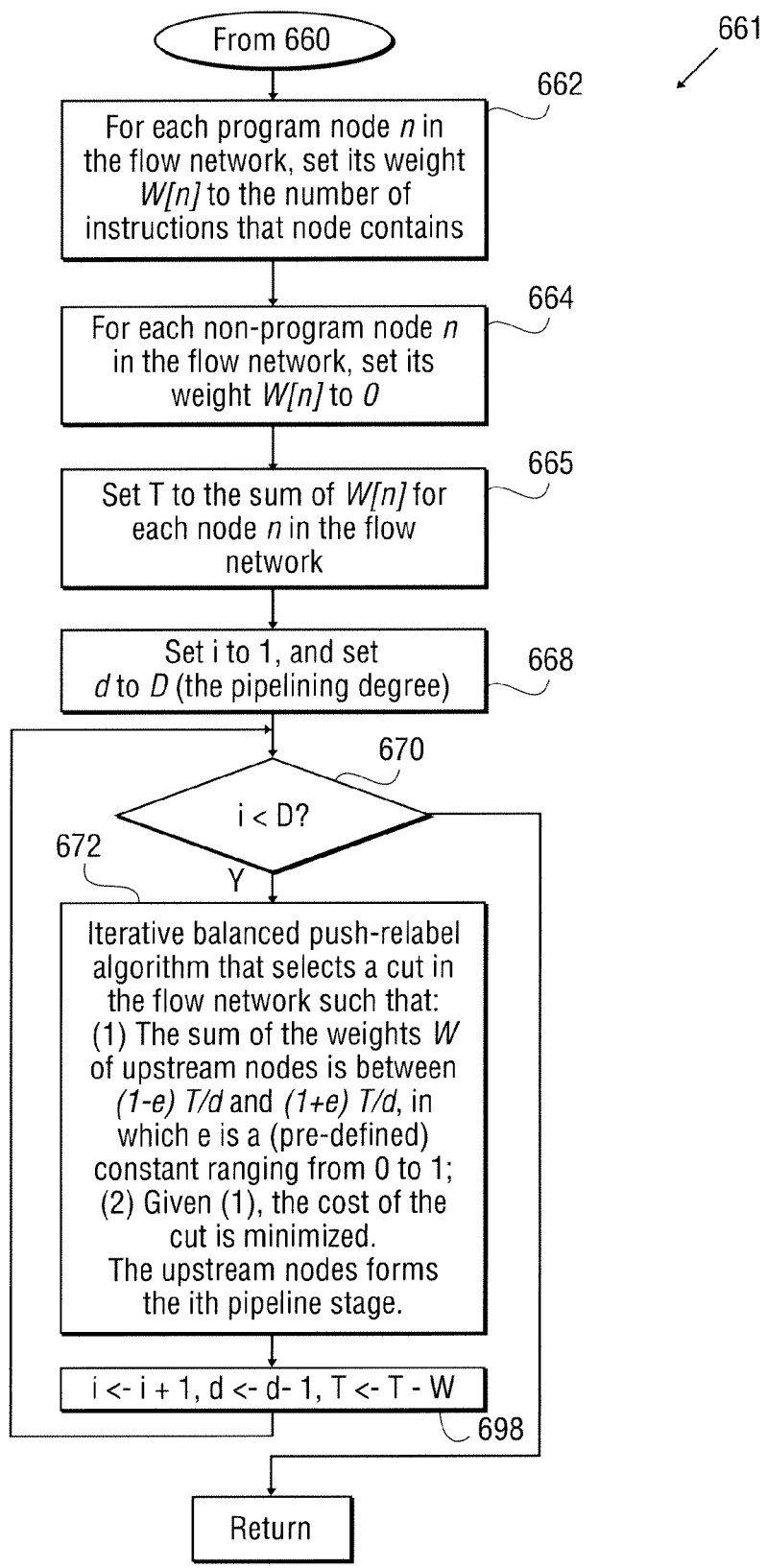
FIG. 13 is a flowchart illustrating a method for selecting a balanced minimum cost cut from a flow network model, in accordance with one embodiment of the invention.

FIG. 13, a flowchart depicting a method 661 for performing cutting of the flow network model of process block 660 of FIG. 9, in accordance with one embodiment of the invention. At process block 662, a weight of each program node (W(N)) is set to the number of instructions contained within the corresponding node. At process block 664, a weight of zero is set to each non-programmed node N in the flow network model. At process block 665, a sum of the weights (W(N)) for each program node N in the flow network model is stored within a value (T). At process block 668, a variable i is set to a value of one and a variable d is set to a value of D (the pipelining degree). At process block 670, it is determined whether the variable i is less than the variable d or pipeline stage degree. Accordingly, at process block 672, a balanced minimum cost cut algorithm is used to select a cut in the flow network model, such that:

$$(i-e) \cdot T/d \leq W(N) \leq (i+e) \cdot T/d \qquad (1)$$

In one embodiment, d is the balance degree and e, a predefined constant ranging from one to zero, is the balance variance. The balance variance reflects the trade-off between the balance and the weight of the cut. If the balance variance is close to zero, the algorithm searches for a more balanced cut than a less weighted cut. Alternatively, if the balance variance is close to one, the algorithm searches for a more weighted cut than a less balanced cut, minimization of the weight is regarded as more important. In one embodiment, an optimal value of balance variance can be readily determined during operation of the invention. Given the equations above, the cost of the cut is minimized, wherein upstream nodes form the pipeline stage. At process block 698, the variable i and the variable d and the variable T are updated, such that process block 672 is repeated to enable selection of balanced minimum cost cuts.

Figure 14:
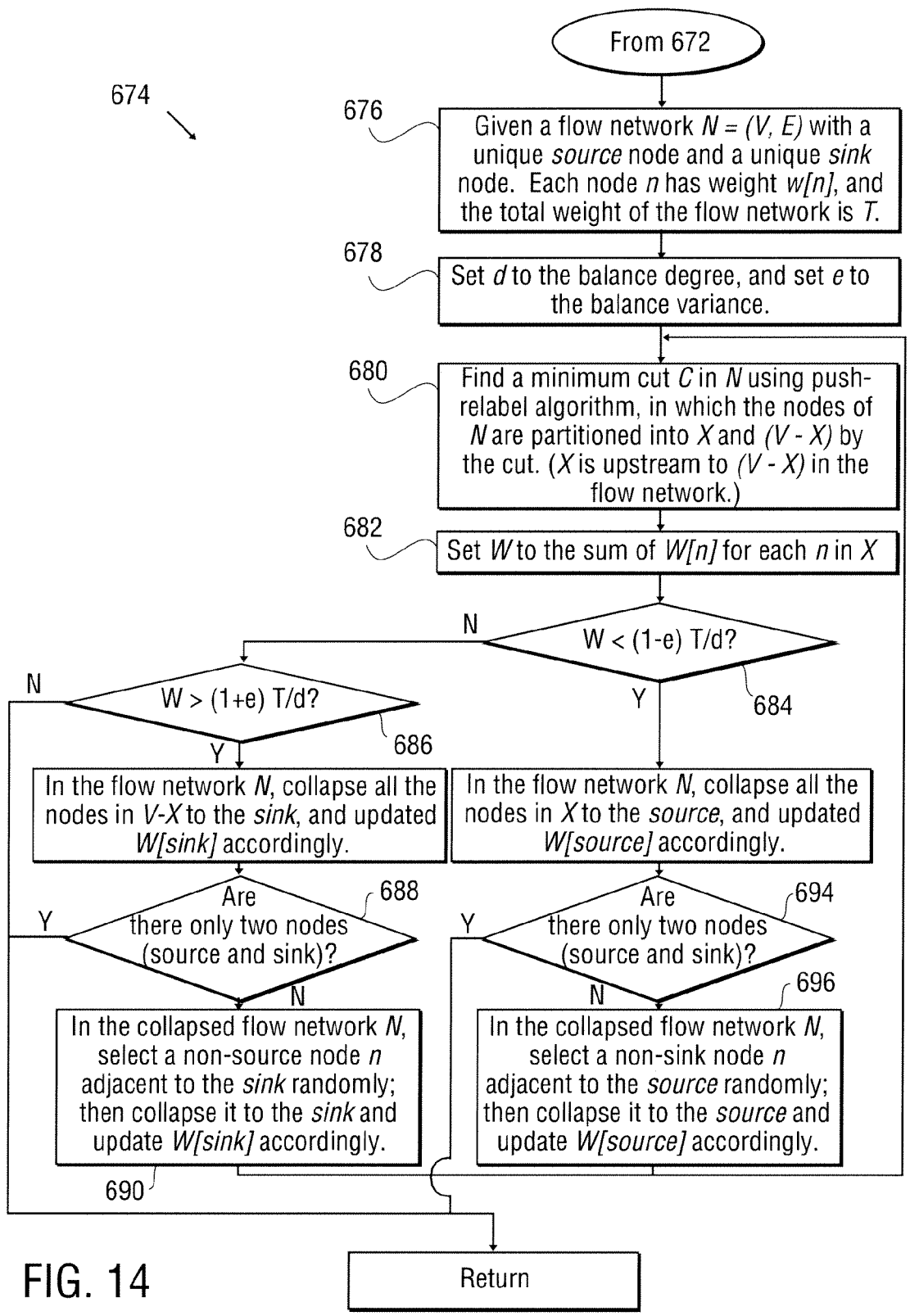
FIG. 14 is a flowchart illustrating a method for performing balanced minimum cost cuts of a network flow model using an iterative balanced push-relabel algorithm, in accordance with one embodiment of the invention.

In one embodiment, a heuristic of iterative balanced push-relabel algorithm is used to select balanced minimum cost cuts in the flow network model. In one embodiment, the algorithm is adapted from an iterative balanced push-relabel algorithm described within "A New Approach To The Maximum Flow Problem", *Proc. 18$^{th}$ ACM STOC,* 1986, by A. V. Goldberg and R. E. Tarjan, pp. 136-146. Accordingly, FIG. 14 is a flowchart illustrating a method 674 for selecting a minimum cost cut of process block 672, as described within "Efficient Flow Based Min-Cut Balanced Partitioning", by H. Yang and D. F. Wong, *Proc. IEEE Int'l Conf. Computer-Aided Design,* 1994, pp. 50-55.

Figure 15:
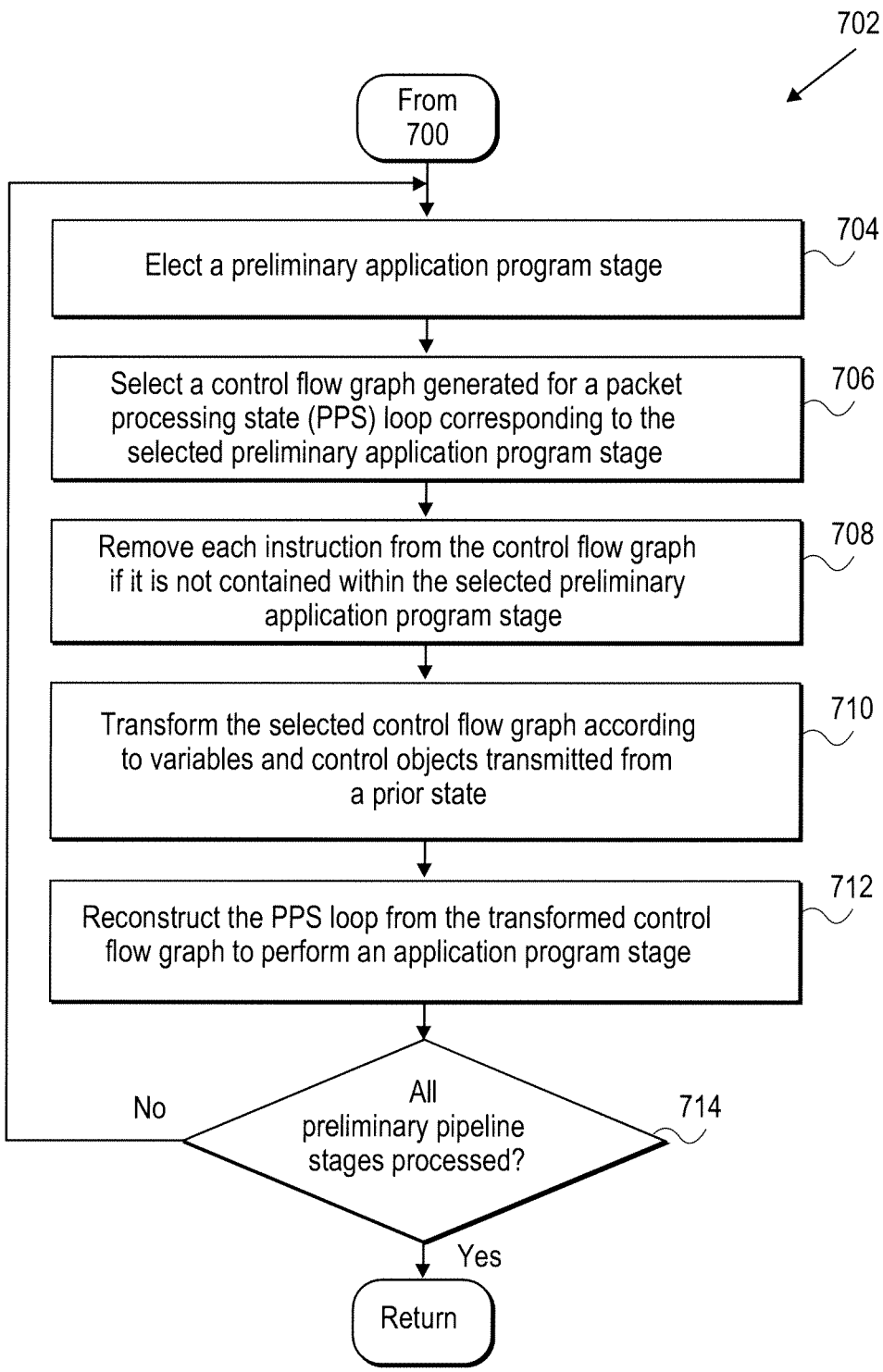
FIG. 15 is a flowchart illustrating a method for transforming the minimum cuts of a flow network model into D-pipeline stages, in accordance with one embodiment of the invention.

FIG. 15 is a flowchart for a method 702 of transformation of preliminary pipeline stages into the D-pipeline stages of a parallel application program, in accordance with one embodiment of the invention. At process block 704, a preliminary pipeline stage is selected. Once selected, at process block 706, a control flow graph for a PPS loop corresponding to the selected stage is selected. At process block 708, instructions not contained within the selected preliminary stage are removed from the selected control flow graph. At process block 710, the control flow graph is transformed according to variable and control objects transmitted from a prior stage to the selected preliminary stage. At process block 712, the PPS loop body is reconstructed from the transformed control flow graph to form a pipeline stage.

Figure 16:
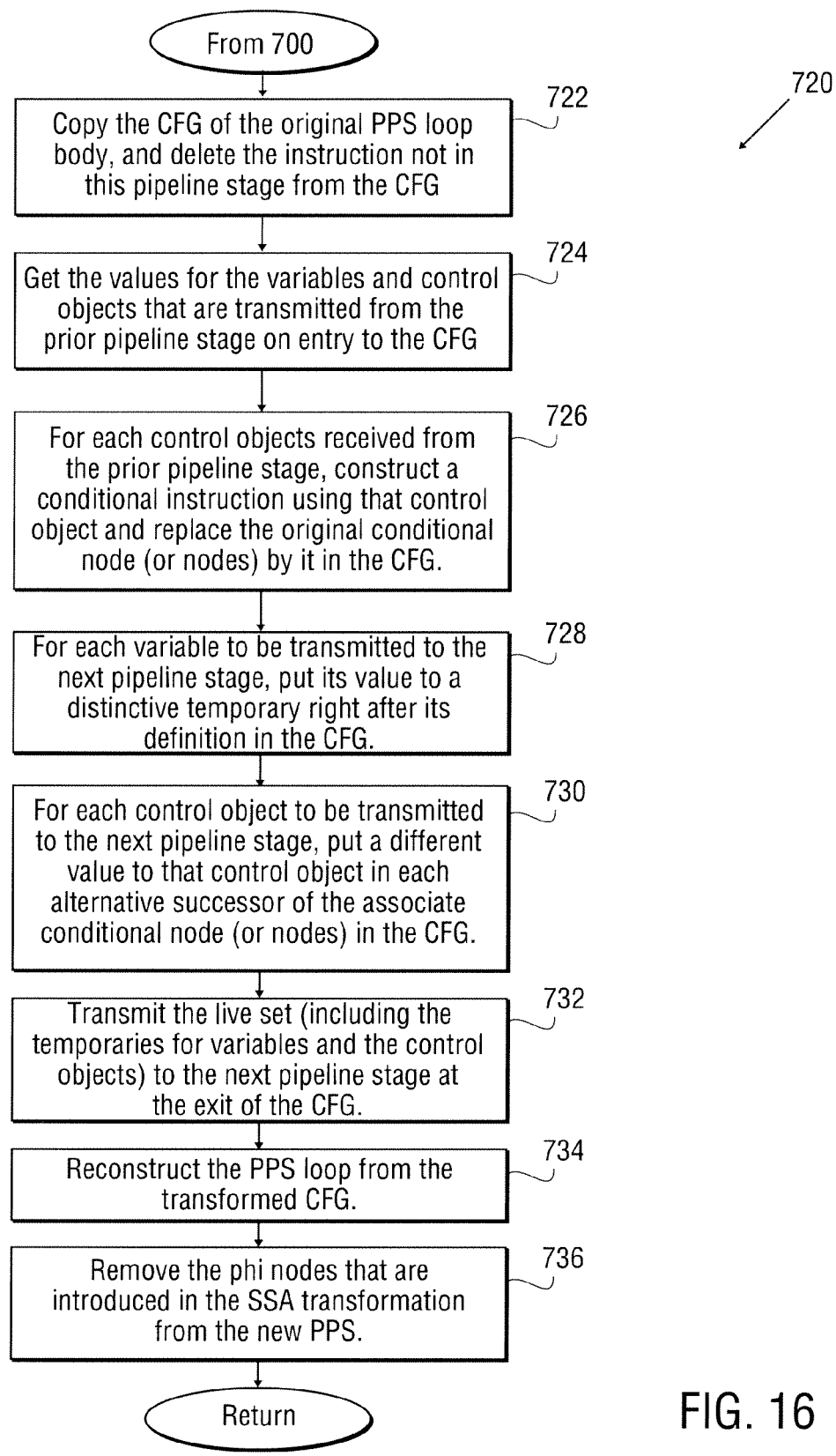
FIG. 16 is a flowchart illustrating a method for transforming the minimum cuts of a flow network model into D-pipeline stages, in accordance with one embodiment of the invention.

Accordingly, by repeating process blocks 704-712 for each of the D-preliminary pipeline stages, a sequential network application is transformed into D-pipeline stages of a parallel network application. In an alternative embodiment, transformation of a preliminary pipeline stage is performed according to a method 720 illustrated by the flowchart depicted in FIG. 16. In one embodiment, control dependence is built from the summarized CFG. However, a conditional in the summarized CFG can be a loop that contains multiple basic blocks. At process block 730, a different value is assigned to a corresponding control object in every successor block of that loop. Furthermore, at process block 726, the reconstruction of that condition should replace the loop by branching to all successor blocks, as shown in process block 726.

In an alternative embodiment, an efficient implementation of this heuristic need not perform the push-relabel algorithm from the scratch in every iteration. Representatively, the push-relabel algorithm may be implemented incrementally as follows: (a) find the initial minimum cut for the flow network using plain push-relabel algorithm, and (b) after nodes are collapsed to the source or sink, locate the updated minimum cut using the push-relabel algorithm with the following initial states: (i) set the pre-flow of all the edges going out of the source to their capacities and update the excesses accordingly, leaving the pre-flow of other edges unchanged; (ii) set the label of the source to the new number of nodes; and (iii) if nodes are collapsed to the source, level the labels of other nodes unchanged; otherwise, set the nodes to zero.

Alternate Embodiments

Several aspects of one implementation of the parallelization compiler for providing for transforming a sequential network application into a D-pipeline stage, parallel network application have been described. However, various implementations of the parallelization compiler provide numerous features including, complementing, supplementing, and/or replacing the features described above. Features can be implemented as part of a multi-processor or as part of a network processor in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to selection of the D-pipeline stages using flow network analysis, it will be appreciated by those skilled in the art that the selection of the D-pipeline stage can be performed using other graph theory heuristics. In fact, heuristics such as data flow analysis, or other like graph theory heuristics to divide a model of the network application fall within the embodiments for selection of the D-pipeline stages, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   configuring one or more processors into a D-stage processor pipeline;
   automatically partitioning a sequential application program into D-coordinated parallel subtasks by:
      constructing a flow network model for the sequential application program according to a summary graph of a dependence graph and identified strongly-connected components (SSC) nodes of the dependence graph; and
      selecting a plurality of preliminary pipeline stages from the flow network model;
   transforming the D-coordinated parallel subtasks into D-pipeline stages that minimize control flow and variable transmission between the D-pipeline stages; and
   executing the D-pipeline stages in parallel within the D-stage processor pipeline to provide parallel execution of an infinite packet processing stage (PPS) loop of the sequential network application program, where D is an integer representing a pipeline degree.

2. The method of claim 1, wherein constructing the flow network model further comprises:
   transforming the application program into a static, single-assignment form;
   building a control flow graph for a loop body of the application program; and
   building the dependence graph based on the summary graph of the control flow graph and identified, strongly-connected components (SSC) of the control flow graph.

3. The method of claim 2, wherein constructing the flow network model comprises:
   assigning a unique source node and a unique sink node to the flow network model; adding a program node to the flow network model for each SSC node identified in the summary graph of the dependence graph;
   adding a variable node to the flow network model for each variable that is defined and used by multiple program nodes;
   adding a control node C to the flow network model for each SSC node identified in the summary graph of the dependence graph as a source of control dependence;
   generating edges having an associated weight to connect corresponding program nodes to corresponding variable nodes;
   generating edges having an associated weight to connect corresponding program nodes to corresponding control nodes; and generating edges between the program nodes and one of the source node and the sink node.

4. The method of claim 3, wherein generating edges having an associated weight to connect corresponding program nodes to corresponding variable nodes further comprises;
   (i) selecting a program node N that defines a variable node V;
   (ii) adding a definition edge Prom node N to node V with a weight VCost to the flow network model;
   (iii) repeating (i)-(ii) for each program node N that defines a variable node V;
   (iv) selecting a program node M that uses a variable node W;
   (v) adding an edge from the node W to the program node M with an assigned weight of infinity to the flow network model; and
   (vi) repeating (iv)-(v) for each program node M that uses a variable node W.

5. The method of claim 3, wherein generating edges having an associated weight to connect corresponding program nodes to corresponding control nodes comprises:
   (i) selecting a program node N that has an associated control node C;
   (ii) adding a definition edge from the selected node N to the associated control node C;
   (iii) associating a weight CCost to the edge;
   (iv) repeating (i)-(iii) for each program node that has an associated control node;
   (v) selecting a program node N having a controlled dependence on another program node M;
   (vi) associating M with the control node C;
   (vii) adding an edge from the associated control node C to the selected program node N;
   (viii) assigning a weight of infinity to the edge; and
   (ix) repeating (v)-(viii) for each node N that has a controlled dependence on another program node M.

6. The method of claim 3, wherein generating the edges between program nodes and one of the source node and the sink nodes comprises:
   (i) selecting a program node without predecessor node in the flow network model;
   (ii) adding an edge from the source node to the selected program node;
   (iii) assigning a weight of zero to the edge;
   (iv) repeating (i)-(iii) for each program node that has no predecessors;
   (v) selecting a program node that has no successors in the flow network;
   (vi) adding an edge from the selected program node to the sink node;
   (vii) assigning a weight of zero to the added edge; and
   (viii) repeating (v)-(vii) for each program node without a successor node in the flow network model.

7. The method of claim 1, wherein selecting the plurality of preliminary pipeline stages comprises: cutting the flow network model into D−1 successive cuts, such that each cut is a balanced minimum cost cut; wherein D has a value greater than or equal to 2.

8. The method of claim 7, wherein cutting is performed using an iterative balanced to push-relabel algorithm.

9. The method of claim 1, wherein modifying the preliminary pipeline stages comprises:
   selecting a preliminary pipeline stage; altering the selected preliminary pipeline stage to enable proper transmission of live variables to and from the selected preliminary pipeline stage;
   altering the selected preliminary pipeline stage to enable proper transmission of control flow to and from the selected preliminary pipeline stage; and repeating the selecting, altering and altering for each preliminary pipeline stage to form the D-pipeline stages of a parallel network application.

10. An article of manufacture including a non-transitory computer readable storage medium having stored thereon instructions which may be used to program a system to perform a method, comprising:
   configuring one or more processors into a D-stage processor pipeline;
   transforming a sequential network application program into D-pipeline stages that collectively perform an infinite packet processing stage (PPS) loop of the sequential network application program by:

constructing a flow network model for the sequential application program according to a summary graph of a dependence graph and identified SSC nodes of the dependence graph; and selecting a plurality of preliminary pipeline stages from the flow network model; and executing the D-pipeline stages in parallel within the D-stage processor pipeline to provide parallel execution of the infinite PPS loop of the sequential network application program, where D is an integer representing a pipeline degree.

11. The article of manufacture of claim 10, wherein transforming the sequential application program further comprises: model; and modifying the preliminary pipeline stages to perform control flow and variable transmission therebetween to form the D-pipeline stages.

12. The article of manufacture of claim 11, wherein constructing the flow network model comprises: transforming the application program into a static, single-assignment form; building a control flow graph for a loop body of the application program; building a dependence graph based on a summary graph of the control flow graph and identified, strongly-connected components (SSC) of the control flow graph.

13. The article of manufacture of claim 12, constructing the flow network model comprises:

adding a unique source node and a unique sink node to the flow network model;

adding a program node to the flow network model for each SSC node identified in the summary graph of the dependence graph;

adding a variable node to the flow network model for each variable that is defined and used by multiple program nodes;

adding a control node C to the flow network model for each SSC node identified in the summary graph of the dependence graph as a source of control dependence;

generating edges having an associated weight to connect corresponding program nodes to corresponding variable nodes;

generating edges having an associated weight to connect corresponding program nodes to corresponding control nodes; and generating edges between the program nodes and one of the source node and the sink node.

14. The article of manufacture of claim 13, generating edges having an associated weight to connect corresponding program nodes to corresponding variable nodes further comprises:

(i) selecting a program node N that defines a variable node V;

(ii) adding a definition edge from node N to node V with a weight VCost to the flow network model;

(iii) repeating (i)-(ii) for each program node N that defines a variable node V;

(iv) selecting a program node M that uses a variable node W;

(v) adding an edge from the node W to the program node M with an assigned weight of infinity to the flow network model; and (vi) repeating (iv)-(v) for each program node M that uses a variable node W.

15. The article of manufacture of claim 13, wherein generating edges having an associated weight to connect corresponding program nodes to corresponding control nodes comprises:

(i) selecting a program node N that has an associated control node C;

(ii) adding a definition edge from the selected node N to the associated control node C;

(iii) associating a weight CCost to the edge;

(iv) repeating (i)-(iii) for each program node that has an associated control node;

(v) selecting a program node N having a controlled dependence on another program node M;

(vi) associating M with the control node C;

(vii) adding an edge from the associated control node C to the selected program node N;

(viii) assigning a weight of infinity to the edge; and (ix) repeating (v)-(viii) for each node N that has a controlled dependence on another program node M.

16. The article of manufacture of claim 13, wherein generating the edges between program nodes and one of the source node and the sink nodes comprises:

(i) selecting a program node without predecessor node in the flow network model;

(ii) adding an edge from the source node to the selected program node;

(iii) assigning a weight of zero to the edge;

(iv) repeating (i)-(iii) for each program node that has no predecessors;

(v) selecting a program node that has no successors in the flow network;

(vi) adding an edge from the selected program node to the sink node;

(vii) assigning a weight of zero to the added edge; and (viii) repeating (v)-(vii) for each program node without a successor node in the flow network model.

17. The article of manufacture of claim 11, wherein selecting the plurality of preliminary pipeline stages comprises:

cutting the flow network model into D−1 successive cuts, such that each cut is a balanced minimum cost cut.

18. The article of manufacture of claim 17, wherein cutting is performed using an iterative balanced to push-relabel algorithm.

19. The article of manufacture of claim 11, wherein modifying the preliminary pipeline stages comprises:

selecting a preliminary pipeline stage;

altering the selected preliminary pipeline stage to enable proper transmission of live variables to and from the selected preliminary pipeline stage;

altering the selected preliminary pipeline stage to enable proper transmission of control flow to and from the selected preliminary pipeline stage; and repeating the selecting, altering and altering for each preliminary stage to form the D-pipeline stages of a parallel network application.

20. A computer-implemented method comprising:

constructing a flow network model from a sequential network application program; cutting the flow network model into a plurality of preliminary pipeline stages; and transforming the preliminary pipeline stages to minimize control flow and variable transmission therebetween to form D-pipeline stages that collectively perform an infinite packet processing stage (PPS) loop of the sequential network application program to enable parallel execution of the infinite PPS loop of the sequential network application program, where D is an integer representing a pipeline degree and wherein transforming the preliminary application program stages comprises:

electing a preliminary application program stage;

selecting a control flow graph generated for the infinite PPS loop corresponding to the selected preliminary application program stage;

removing instructions from the control flow graph if the instruction is not contained within the selected preliminary pipeline stage;

transforming the selected control flow graph according to variables and control objects transmitted from a prior stage;

reconstructing the PPS loop from the transformed control flow graph to form a pipeline stage.

21. The method of claim 20, wherein transforming the preliminary application program stages further comprises repeating the preliminary application program stages for each preliminary pipeline stage to form D-pipeline stages of a parallel network application program.

22. The method of claim 21, wherein transforming the control flow further comprises:

selecting values for control objects transmitted from a prior pipeline stage on entry to the control flow graph;

for each control object received from the prior pipeline stage, constructing a conditional instruction using the control object; and replacing corresponding conditional nodes within the CFG with the conditional instruction.

23. The method of claim 21, wherein transforming the control flow further comprises:

selecting values for variables that are transmitted from a prior pipeline stage; and for each variable transmitted to a next pipeline stage, setting a value of the variable to a distinctive temporary following definition of the variable within the control flow graph.

24. The method of claim 21, wherein transforming the control flow graph further comprises:

for each control object to be transmitted to a next pipeline stage, placing an alternate value of the control object in each alternate successor node of a conditional node associated with the control object in the control flow graph; and transmitting live set data to a next pipeline stage at exit of the control flow graph.

25. An article of manufacture including a non-transitory machine readable medium having stored thereon instructions which may be used to program a system to perform a method, comprising:

constructing a flow network model from a sequential network application program;

cutting the flow network model into a plurality of preliminary pipeline stages; and transforming the preliminary pipeline stages to minimize control flow and variable transmission therebetween in order to form D-pipeline stages that collectively perform an infinite packet processing stage (PPS) loop of the sequential network application program to enable parallel execution of the infinite PPS loop of the sequential network application program, where D is an integer representing a pipeline degree and wherein transforming the preliminary application program stages comprises:

electing a preliminary application program stage;

selecting a control flow graph generated for the infinite PPS loop corresponding to the selected preliminary application program stage;

removing instructions from the control flow graph if the instruction is not contained within the selected preliminary pipeline stage;

transforming the selected control flow graph according to variables and control objects transmitted from a prior stage;

reconstructing the PPS loop from the transformed control flow graph to form a pipeline stage.

26. The article of manufacture of claim 25, wherein transforming the preliminary application program stages further comprises repeating the preliminary application program stages for each preliminary pipeline stage to form D-pipeline stages of a parallel network application program.

27. The article of manufacture of claim 25, wherein transforming the control flow graph further comprises:

selecting values for control objects transmitted from a prior pipeline stage on entry to the control flow graph;

for each control object received from the prior pipeline stage, constructing a conditional instruction using the control object; and replacing corresponding conditional nodes within the control flow graph with the conditional instruction.

28. The article of manufacture of claim 27, wherein transforming the control flow graph further comprises:

for each control object to be transmitted to a next pipeline stage, placing an alternate value of the control object in each alternate successor node of a conditional node associated with the control object in the control flow graph; and transmitting live set data to a next pipeline stage at exit of the control flow graph.

29. The article of manufacture of claim 25, wherein transforming the control flow graph further comprises:

selecting values for variables that are transmitted from a prior pipeline stage; and for each variable transmitted to a next pipeline stage, setting a value of the variable to a distinctive temporary following definition of the variable within the control flow graph.

30. An apparatus, comprising: a processor;

a memory coupled to the processor, including a compiler to:

cause transformation of a sequential network application program into D-pipeline stages that collectively perform an infinite packet processing stage (PPS) loop of the sequential network application program to enable parallel execution of the D-pipeline stages within a D-stage processor pipeline to provide parallel execution of the infinite PPS loop of the sequential network application program, where D is an integer representing a pipeline degree;

cause construction of a flow network model for the sequential application program; and cause D−1 successive cuts of the flow network model, such that each cut is a balanced, minimum cost cut to form the D-preliminary pipeline stages.

31. The apparatus of claim 30, wherein the compiler to cause selection of a plurality of preliminary pipeline stages from the flow network model and to cause modification of the preliminary pipeline stages to perform control flow and variable transformation therebetween to form the D-pipeline stages.

32. A system comprising:

a processor;

a memory controller coupled to the processor; and a double data rate (DDR) synchronous RAM (SRAM) memory coupled to the processor, the memory including a compiler to automatically partition a sequential application program into D-coordinated parallel subtasks, to transform the D-coordinated parallel subtasks into D-pipeline stages that minimize control flow and variable transmission between the D-pipeline stages to enable parallel execution of the D-application program stages within a D-stage processor pipeline to provide parallel execution of an infinite packet processing stage (PPS) loop of the sequential network application program, to cause construction of a flow network model for the sequential application program and to cause D−1 successive cuts of the flow network model, such that each cut is a balanced, minimum cost cut to form the D-preliminary pipeline stages, where D is an integer representing a pipeline degree.

33. The system of claim 32, wherein the compiler to cause selection of a plurality of preliminary pipeline stages from the flow network model and to cause modification of the preliminary pipeline stages to perform control flow and variable transformation therebetween to form the D-pipeline stages.

* * * * *